United States Patent
Motodani et al.

(10) Patent No.: US 9,879,874 B2
(45) Date of Patent: Jan. 30, 2018

(54) AIR-CONDITIONING SYSTEM CONTROL APPARATUS

(71) Applicant: MITSUBISHI ELECTRIC CORPORATION, Chiyoda-ku (JP)

(72) Inventors: Mio Motodani, Chiyoda-ku (JP); Takaya Yamamoto, Chiyoda-ku (JP); Yoshitaka Uno, Chiyoda-ku (JP); Kazuhiro Komatsu, Chiyoda-ku (JP)

(73) Assignee: MITSUBISHI ELECTRIC CORPORATION, Chiyoda-ku (JP)

(*) Notice: Subject to any disclaimer, the term of this patent is extended or adjusted under 35 U.S.C. 154(b) by 193 days.

(21) Appl. No.: 14/781,505

(22) PCT Filed: Mar. 31, 2014

(86) PCT No.: PCT/JP2014/059417
§ 371 (c)(1),
(2) Date: Sep. 30, 2015

(87) PCT Pub. No.: WO2014/171314
PCT Pub. Date: Oct. 23, 2014

(65) Prior Publication Data
US 2016/0054018 A1 Feb. 25, 2016

(30) Foreign Application Priority Data

Apr. 15, 2013 (JP) ................. 2013-084725

(51) Int. Cl.
*F24F 11/00* (2006.01)
*G05B 13/04* (2006.01)

(52) U.S. Cl.
CPC .......... *F24F 11/006* (2013.01); *F24F 11/001* (2013.01); *F24F 11/0008* (2013.01);
(Continued)

(58) Field of Classification Search
CPC .... F24F 11/006; F24F 11/0008; F24F 11/001; F24F 11/0012; F24F 11/0076;
(Continued)

(56) References Cited

U.S. PATENT DOCUMENTS

2005/0192915 A1* 9/2005 Ahmed ................. G06N 3/02
706/21
2012/0330626 A1* 12/2012 An ........................ G01K 17/20
703/2

(Continued)

FOREIGN PATENT DOCUMENTS

JP 3049266 B2 3/2000
JP 2002-349937 A 12/2002
(Continued)

OTHER PUBLICATIONS

International Search Report dated Jul. 15, 2014, in PCT/JP2014/059417 filed Mar. 31, 2014.
(Continued)

*Primary Examiner* — Robert Fennema
*Assistant Examiner* — Jigneshkumar Patel
(74) *Attorney, Agent, or Firm* — Oblon, McClelland, Maier & Neustadt, L.L.P.

(57) ABSTRACT

An air-conditioning system control apparatus capable of, even for a room in which a humidity sensor is not installed, accurately estimating an indoor humidity and preventing an indoor temperature and humidity from deviating from comfortable ranges. The air-conditioning system control apparatus includes a thermal characteristic parameter setting unit configured to determine a thermal characteristic parameter of a building thermal model based on a heat equation, a humidity characteristic parameter setting unit configured to determine a humidity characteristic parameter of a building humidity model based on a moisture balance equation in an
(Continued)

air-conditioned space, and a control data generation unit configured to generate control data of an air-conditioning apparatus so that a temperature and a humidity of the air-conditioned space are each within a preset range.

12 Claims, 4 Drawing Sheets

(52) U.S. Cl.
CPC ...... *F24F 11/0012* (2013.01); *F24F 11/0076* (2013.01); *G05B 13/048* (2013.01); *F24F 2011/0013* (2013.01); *F24F 2011/0046* (2013.01); *F24F 2011/0047* (2013.01); *F24F 2011/0058* (2013.01); *F24F 2011/0063* (2013.01); *F24F 2011/0068* (2013.01); *F24F 2011/0075* (2013.01)

(58) Field of Classification Search
CPC ....... F24F 2011/0013; F24F 2011/0046; F24F 2011/0047; F24F 2011/0058; F24F 2011/0063; F24F 2011/0068; G05B 13/048

USPC ........................................................ 700/276
See application file for complete search history.

(56) References Cited

U.S. PATENT DOCUMENTS

| | | |
|---|---|---|
| 2014/0000836 A1 | 1/2014 | Xu et al. |
| 2014/0067132 A1* | 3/2014 | Macek ................... F24F 11/006 700/276 |

FOREIGN PATENT DOCUMENTS

| | | |
|---|---|---|
| JP | 2003-74943 A | 3/2003 |
| JP | 2007-72991 A | 3/2007 |
| JP | 2009-257617 A | 11/2009 |
| JP | 2010-249492 A | 11/2010 |
| JP | 2011-214794 A | 10/2011 |
| JP | 2014-9939 A | 1/2014 |

OTHER PUBLICATIONS

Office Action dated Aug. 31, 2017 in Philippines Patent Application No. 1/2015/502357.

* cited by examiner

□ RELATIONSHIP BETWEEN TEMPERATURE AND SATURATED WATER VAPOR AMOUNT —— APPROXIMATION LINE (WHEN TEMPERATURE IS 18 DEGREES CELSIUS TO 28 DEGREES CELSIUS)

AIR-CONDITIONING SYSTEM CONTROL APPARATUS

TECHNICAL FIELD

The present invention relates to an air-conditioning system control apparatus configured to control the temperature and humidity of indoor air.

BACKGROUND ART

In recent years, there has been an increasing demand for saving energy of various air conditioning apparatus forming an air-conditioning system installed in, for example, buildings. To meet this demand, there have been many proposals for an air-conditioning system control apparatus configured to reduce the power of an air-conditioning apparatus. In addition to reduced energy consumption, the thermal perception of a person in a room, or so-called comfort level, also needs to be satisfied, and hence an air-conditioning system control apparatus for achieving both reduced energy consumption and a satisfactory comfort level has also been proposed.

Hitherto, many air-conditioning system control apparatus have been configured to control operation of an air-conditioning apparatus so that an indoor temperature and humidity are each within a comfortable range based on information on the indoor temperature and humidity, operating data of the air-conditioning apparatus, and other information. For example, a method exists for determining a control target value based on a thermal environment evaluation index, such as a predicted mean vote (PMV, defined by ISO 7730 in 1987) (refer to Patent Literature 1).

Further, there is also a method of controlling an air-conditioning apparatus so that the indoor temperature and humidity are each within a comfortable range by estimating the indoor temperature and humidity based on an outside air discomfort index determined based on the outside air temperature and the outside air relative humidity (refer to Patent Literature 2).

CITATION LIST

Patent Literature

Patent Literature 1: Japanese Patent No. 3049266 (paragraph [0011])
Patent Literature 2: Japanese Unexamined Patent Application Publication No. 2003-74943 (Abstract)

SUMMARY OF INVENTION

Technical Problem

However, the technology of Patent Literature 1 suffers from a drawback in that the indoor temperature and humidity and wall surface temperature need to be detected with a sensor to calculate the PMV, causing cost increase by the amount of the sensor installation cost.

The technology of Patent Literature 2 estimates the indoor comfort level based on the outside air temperature and the outside air relative humidity that are acquired from a company for distributing meteorological data, without needing to additionally install a sensor. However, the indoor comfort level changes based on not only the outside air temperature and the outside air relative humidity, but also on the number of people in the room, the operating state of the air-conditioning apparatus, and other conditions. Therefore, there is a problem in that the indoor comfort level cannot be estimated based only on the outside air temperature and the outside air relative humidity. Further, there is also a problem in that a relationship between the outside air discomfort index, which is determined based on the outside air temperature and the outside air relative humidity, and the indoor comfort level needs to be set for each building in advance, requiring a lot of work and effort.

The present invention has been created in view of the above-mentioned circumstances. It is an object of the present invention to provide an air-conditioning system control apparatus capable of, even for a room in which a humidity sensor is not installed, accurately estimating an indoor humidity and preventing the indoor temperature and humidity from deviating from a comfortable range.

Further, it is another object of the present invention to provide an air-conditioning system control apparatus capable of reducing a total power consumption of an air-conditioning apparatus forming an air-conditioning system.

In addition, it is yet another object of the present invention to provide an air-conditioning system control apparatus capable of reducing power consumption and achieving a satisfactory comfort level.

Solution to Problem

According to one embodiment of the present invention, there is provided an air-conditioning system control apparatus configured to control an air-conditioning apparatus configured to air-condition a space to be air-conditioned (air-conditioned space) of a building, the air-conditioning system control apparatus including: a data storage unit configured to store input data for parameter setting including at least meteorological data of a region including the building and operating data of the air-conditioning apparatus; a thermal characteristic parameter setting unit including information on a building thermal model that is based on a heat equation of the air-conditioned space, the thermal characteristic parameter setting unit being configured to determine, based on the input data for parameter setting, a thermal characteristic parameter, which is a physical parameter of the building thermal model; a humidity characteristic parameter setting unit including information on a building humidity model that is based on a moisture balance equation of the air-conditioned space, the humidity characteristic parameter setting unit being configured to determine, based on the thermal characteristic parameter and the input data for parameter setting, a humidity characteristic parameter, which is a physical parameter of the building humidity model; a control data generation unit configured to generate, based on input data for prediction including at least the input data for parameter setting, the building thermal model, the building humidity model, the thermal characteristic parameter, and the humidity characteristic parameter, control data of the air-conditioning apparatus so that a temperature and a humidity of the air-conditioned space are each within a preset range; and a control data output unit configured to transmit the control data to the air-conditioning apparatus.

Advantageous Effects of Invention

The present invention is capable of preventing the temperature and humidity of the air-conditioned space from deviating from the preset ranges even in the air-conditioned space in which the humidity sensor is not installed.

DESCRIPTION OF EMBODIMENTS

Embodiment 1

Figure 1:
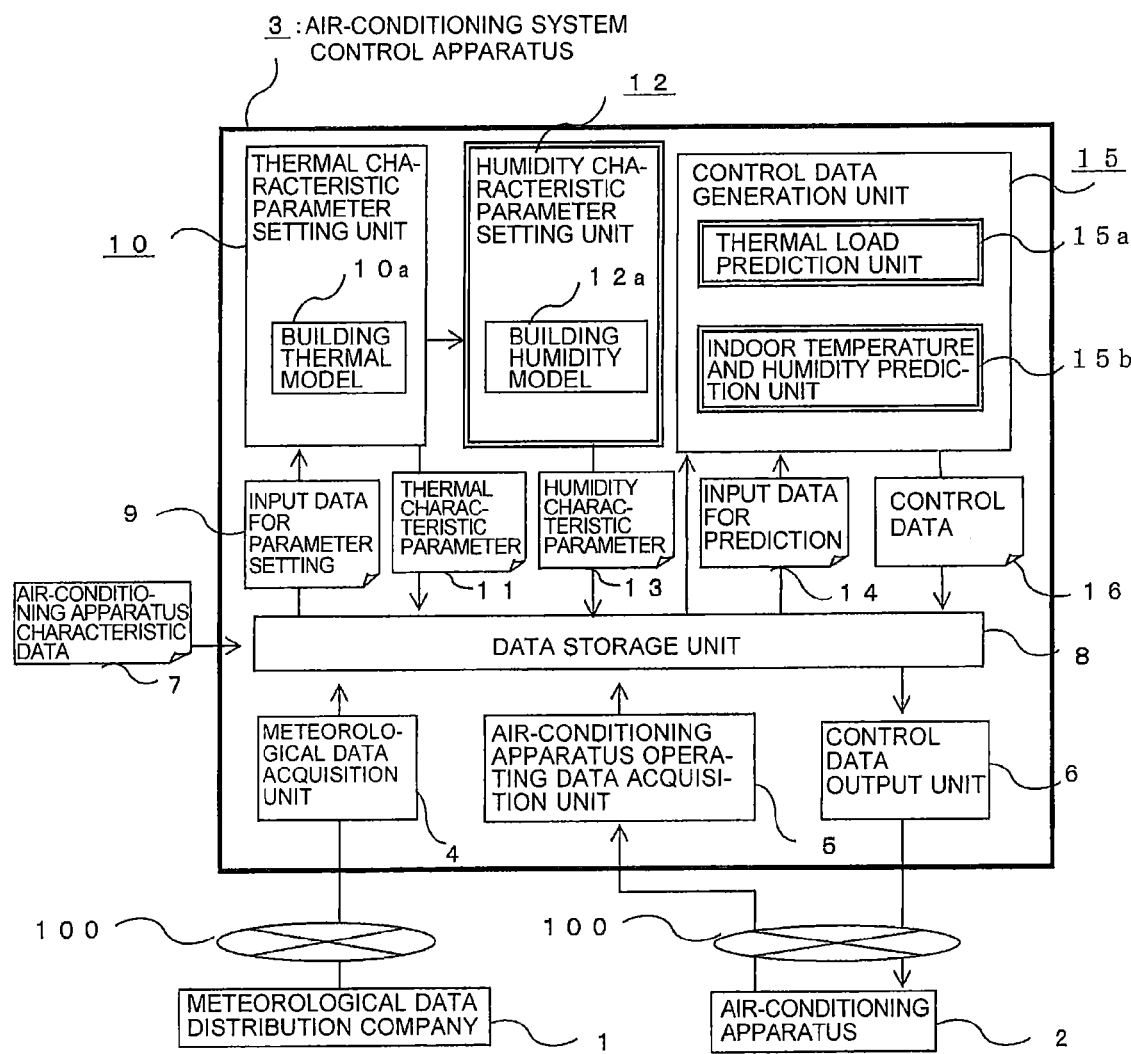
FIG. 1 is a diagram illustrating a configuration of an air-conditioning system control apparatus according to Embodiment 1 of the present invention.

FIG. 1 is a diagram illustrating a configuration of an air-conditioning system control apparatus according to Embodiment 1 of the present invention.

In FIG. 1, an air-conditioning system control apparatus 3 is configured to be capable of data communication with a meteorological data distribution company 1 via a communication unit 100, such as the Internet. Further, the air-conditioning system control apparatus 3 is configured to be capable of data communication with one or a plurality of air-conditioning apparatus 2 configured to air-condition an air-conditioned space in a target building (not shown) via the communication unit 100, such as the Internet.

The air-conditioning system control apparatus 3 controls the air-conditioning apparatus 2 installed in a target building based on input information from the meteorological data distribution company 1 and the air-conditioning apparatus 2, and air-conditioning apparatus characteristic data 7 (input by a user, for example).

The air-conditioning system control apparatus 3 includes a meteorological data acquisition unit 4, an air-conditioning apparatus operating data acquisition unit 5, a control data output unit 6, a data storage unit 8, a thermal characteristic parameter setting unit 10, a humidity characteristic parameter setting unit 12, and a control data generation unit 15. Further, the thermal characteristic parameter setting unit 10 includes a building thermal model 10a, and the humidity characteristic parameter setting unit 12 includes a building humidity model 12a. The control data generation unit 15 includes a thermal load prediction unit 15a configured to predict the thermal load of the building interior, and an indoor temperature and humidity prediction unit 15b configured to predict the temperature and humidity of the building interior.

The meteorological data acquisition unit 4 is connected to the meteorological data distribution company 1 via the communication unit 100. The air-conditioning apparatus operating data acquisition unit 5 is connected to the air-conditioning apparatus 2 via the communication unit 100.

The data storage unit 8 stores the data acquired via the meteorological data acquisition unit 4 and the air-conditioning apparatus operating data acquisition unit 5. Also, the data storage unit 8 is configured to input data for parameter setting 9 to the thermal characteristic parameter setting unit 10, and input data for prediction 14 to the control data generation unit 15. Further, the data storage unit 8 stores a thermal characteristic parameter 11 (hereafter, may also be referred to as the thermal characteristic parameters 11) calculated by the thermal characteristic parameter setting unit 10, a humidity characteristic parameter 13 (hereafter, may also be referred to as the humidity characteristic parameters 13) calculated by the humidity characteristic parameter setting unit 12, and control data 16 calculated by the control data generation unit 15 as calculation results.

The control data output unit 6 is configured to transmit the control data 16 stored in the data storage unit 8 to the air-conditioning apparatus 2 via the communication unit 100.

The thermal characteristic parameter setting unit 10 is configured to acquire certain input data for parameter setting 9 from the data storage unit 8, and based on the building thermal model 10a that is based on a heat equation, determine the thermal characteristic parameter 11 (physical parameter in the building thermal model 10a).

The humidity characteristic parameter setting unit 12 is configured to set the humidity characteristic parameter 13 based on the input data for parameter setting 9 acquired by the thermal characteristic parameter setting unit 10 from the data storage unit 8 and the thermal characteristic parameter 11, which is a calculation result of the thermal characteristic parameter setting unit 10.

The thermal load prediction unit 15a is configured to predict a thermal load of the building based on the building thermal model 10a in the thermal characteristic parameter setting unit 10, the thermal characteristic parameter 11 calculated by the thermal characteristic parameter setting unit 10, and certain input data for prediction 14 stored in the data storage unit 8.

The indoor temperature and humidity prediction unit 15b is configured to predict the indoor temperature and humidity based on the building thermal model 10a in the thermal characteristic parameter setting unit 10, the building humidity model 12a in the humidity characteristic parameter setting unit 12, and certain input data for prediction 14 stored in the data storage unit 8.

Based on the thermal load determined by the thermal load prediction unit 15a, the indoor temperature and humidity determined by the indoor temperature and humidity prediction unit 15b, and the input data for prediction 14, the control data generation unit 15 is configured to generate the control data 16 of the air-conditioning apparatus 2 in consideration of the thermal characteristic and the humidity characteristic of the building so that the indoor temperature and humidity are each within a comfortable range and power consumption is reduced. Then, the control data generation unit 15 stores the generated control data 16 in the data storage unit 8.

The control data output unit 6 is configured to read the control data 16 generated by the control data generation unit 15 from the data storage unit 8, and transmit the read control data 16 to the air-conditioning apparatus 2.

Note that, although one air-conditioning apparatus 2 is representatively illustrated in FIG. 1, a plurality of air-conditioning apparatus 2 is also permitted. Further, the air-conditioning apparatus 2 may be a building multi-air conditioner, a package air conditioner, or a room air conditioner, which includes an outdoor unit and an indoor unit, or a large-scale heat source such as an absorption refrigerator.

Figure 2:
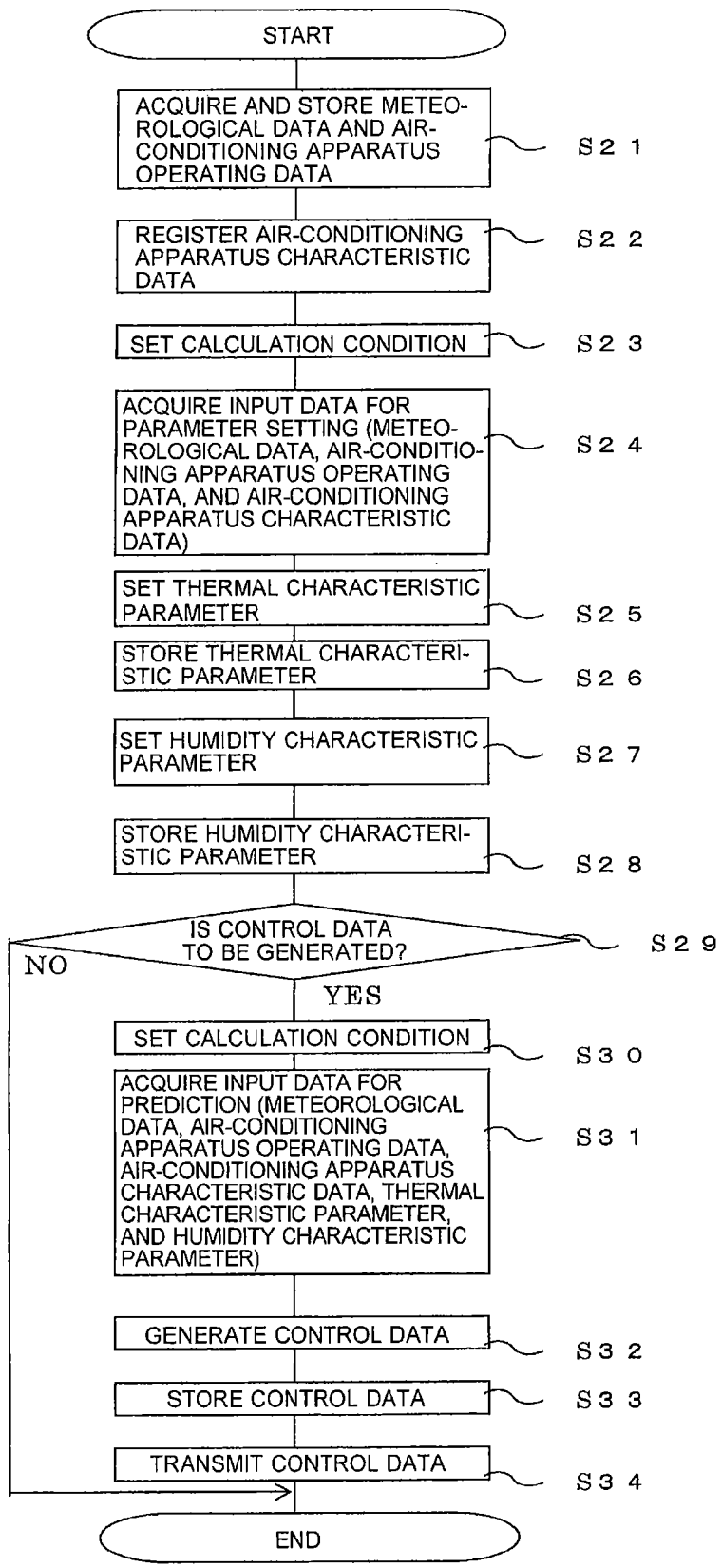
FIG. 2 is a flowchart illustrating operation of the air-conditioning system control apparatus according to Embodiment 1 of the present invention.

FIG. 2 is a flowchart illustrating operation of the air-conditioning system control apparatus according to Embodiment 1 of the present invention. The respective steps of FIG. 2 are described below with reference to FIG. 3 to FIG. 5.

(Step S21)

The air-conditioning system control apparatus 3 acquires the respective pieces of data via the meteorological data acquisition unit 4 and the air-conditioning apparatus operating data acquisition unit 5, and stores the acquired data.

Specifically, the air-conditioning system control apparatus 3 acquires meteorological data of a predetermined location from the meteorological data distribution company 1 via the meteorological data acquisition unit 4, and stores the acquired meteorological data in the data storage unit 8. The meteorological data of the predetermined location includes at least an amount of solar radiation, an outside air temperature, and an outside relative humidity. This meteorological data not only includes past data, but also includes predicted future values. Note that, when predicted future values for the amount of solar radiation and the outside relative humidity cannot be acquired, the meteorological data may include weather forecast information, such as sunny or cloudy, and data on a representative amount of solar radiation and data on a representative outside relative humidity may be corrected based on the weather forecast.

Further, the air-conditioning system control apparatus 3 acquires operating data of the air-conditioning apparatus 2 via the air-conditioning apparatus operating data acquisition unit 5, and stores the acquired operating data in the data storage unit 8. The operating data of the air-conditioning apparatus 2 includes at least a room temperature of a room in which the air-conditioning apparatus 2 is installed, and data enabling the amount of heat supplied into (or, removed from) the room by the air-conditioning apparatus 2 to be calculated. Examples of data enabling the amount of heat supplied into (or, removed from) the room by the air-conditioning apparatus 2 to be calculated may include data acquirable with existing sensors, such as an operating frequency of each outdoor unit, an evaporating temperature, a condensing temperature, and a set temperature of the indoor unit. Further, the temperature of the suction air of the indoor unit may be used instead of the room temperature.

Note that, Step S21 is automatically executed periodically or constantly, and the acquired data is successively stored in the data storage unit 8.
(Step S22)

The air-conditioning system control apparatus 3 registers (stores) the air-conditioning apparatus characteristic data 7 representing a performance of the air-conditioning apparatus 2 in the data storage unit 8. This air-conditioning apparatus characteristic data 7 may be registered in the data storage unit 8 by a user operation in advance, or may be determined based on estimation from the operating data of the air-conditioning apparatus 2.

The air-conditioning apparatus characteristic data 7 includes at least a relationship between the power consumption of each air-conditioning apparatus 2 and the amount of heat supplied (or removed) by each air-conditioning apparatus 2. When the amount of heat supplied (or removed) by the air-conditioning apparatus 2 cannot be acquired by the air-conditioning apparatus operating data acquisition unit 5, and it is thus necessary to calculate the amount of heat based on the operating frequency of the outdoor unit of the air-conditioning apparatus 2, for example, the air-conditioning apparatus characteristic data 7 includes a relationship between power consumption and the operating frequency of each outdoor unit, the evaporating temperature, the condensing temperature, and the heat supply amount.
(Step S23)

Next, based on a user operation, for example, information such as a number for identifying a space (a room, a floor, etc.) in the target building to be controlled, and a calculation condition such as a learning period (time range for extracting data) are set.
(Step S24)

The thermal characteristic parameter setting unit 10 extracts and acquires the input data for parameter setting 9 from the data storage unit 8. Note that, the input data for parameter setting 9 includes at least past meteorological data of a predetermined location, past operating data of each air-conditioning apparatus 2 installed in the target building, and the air-conditioning apparatus characteristic data 7.
(Step S25)

The thermal characteristic parameter setting unit 10 sets the thermal characteristic parameter 11 based on the building thermal model 10a.
[Setting of Thermal Characteristic Parameter 11]

The setting of the thermal characteristic parameter 11 by the thermal characteristic parameter setting unit 10 is described below in more detail.

Figure 3:
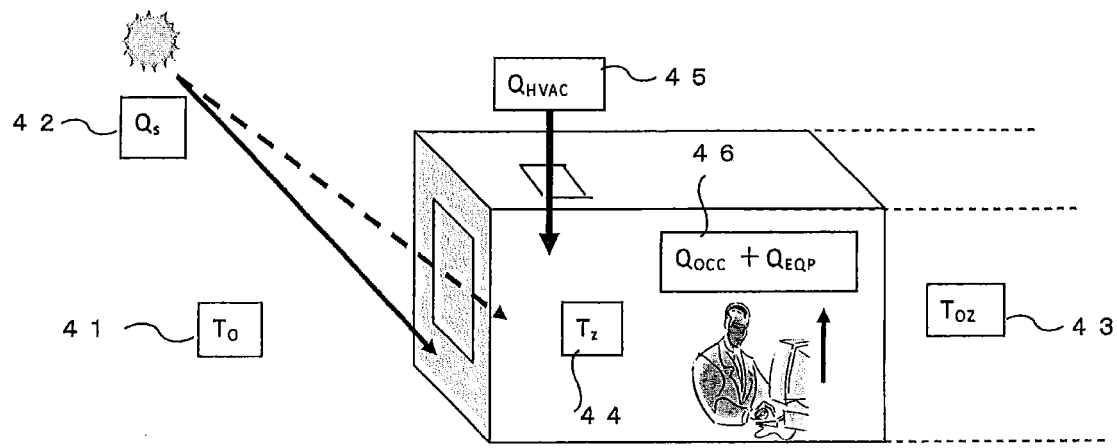
FIG. 3 is a diagram illustrating a building thermal model of the air-conditioning system control apparatus according to Embodiment 1 of the present invention.

FIG. 3 is a diagram illustrating a building thermal model of the air-conditioning system control apparatus according to Embodiment 1 of the present invention.

In FIG. 3, an example of each of the factors to be considered in the building thermal model 10a is schematically illustrated. For example, in the building thermal model 10a, an outside air temperature ($T_O$) 41, an amount of solar radiation ($Q_S$) 42, an adjacent room temperature ($T_{OZ}$) 43, an indoor temperature ($T_Z$) 44, an amount of heat removed by air conditioning ($Q_{HVAC}$) 45, and an amount of heat generated indoors ($Q_{OCC}+Q_{EQP}$) (people+OA equipment+lighting) 46 are considered as factors influencing the thermal load.

Equations (1) to (3) are derived by expressing the relationship of the above-mentioned factors influencing the thermal load as theoretical equations (heat equations).

[Math. 1]

$$C_1 \frac{dT_1}{dt} = \beta Q_s + \frac{(T_o - T_1)}{R_1} - \frac{(T_1 - T_2)}{R_2} \quad (1)$$

$$C_2 \frac{dT_2}{dt} = \alpha Q_s + \frac{(T_1 - T_2)}{R_2} - \frac{(T_2 - T_z)}{R_z} \quad (2)$$

$$C_z \frac{dT_z}{dt} = \delta Q_{HVAC} + \rho Q_{acc} + \gamma Q_{EQP} + \frac{(T_o - T_z)}{R_{WIN}} - \frac{(T_2 - T_z)}{R_Z} - \frac{(T_Z - T_{OZ})}{R_{OZ}} \quad (3)$$

In Equations (1) to (3), $Q_S$ represents the amount of solar radiation (kW/m$^2$), $Q_{OCC}$ represents the amount of heat (kW) generated by people, $Q_{EQP}$ represents the amount of heat (kW) generated by equipment, $Q_{HVAC}$ represents the amount of heat (kW) removed (supplied) by air conditioning, $T_O$ represents the outside air temperature (K), $T_1$ represents the surface temperature (K) of an outdoor side of an exterior wall, $T_2$ represents the surface temperature (K) of an indoor side of the exterior wall, $T_Z$ represents the indoor temperature (K), $T_{OZ}$ represents the temperature (K) of an adjacent room, $R_1$ represents an outdoor side thermal resistance (K/kW), $R_2$ represents an exterior wall thermal resistance (K/kW), $R_z$ represents an indoor side thermal resistance (K/kW), $R_{OZ}$ represents an interior wall thermal resistance (K/kW), $R_{WIN}$ represents a window thermal resistance (K/kW), $C_1$ represents a heat capacity (kJ/K) of the outdoor side of the exterior wall, $C_2$ represents the heat capacity (kJ/K) of the indoor side of the exterior wall, $C_Z$ represents an indoor heat capacity (kJ/K), $\alpha$ represents a correction coefficient (–) of the amount of solar radiation entering indoors, $\beta$ represents a coefficient (–) of the amount of solar radiation hitting the exterior wall, $\gamma$ represents a correction coefficient (–) of the heat generated by equipment, $\delta$ represents a correction coefficient (–) of the amount of heat removed (supplied) by air conditioning, and $\rho$ represents a correction coefficient (–) of the amount of heat generated by people.

Rewriting Equations (1) to (3) as state-space models gives Equations (4) and (5).

[Math. 2]

$$\frac{\partial x(t)}{\partial t} = A(\theta)x(t) + B(\theta)u(t) + K(\theta)e_1(t) \quad (4)$$

$$y(t) = C(\theta)x(t) + e_2(t) \quad (5)$$

In Equations (4) and (5), $\theta$ represents a vector of an unknown thermal characteristic parameter 11, and is determined so that an error between an actual room temperature and a calculated room temperature is at a minimum. Note that, although the prediction target is the room temperature, the thermal load (=the amount of heat removed by air conditioning $Q_{HVAC}$) may also be predicted by providing the room temperature as a desired room temperature.

In Equation (4), A ($\theta$) is represented by the following parameter matrix (state-transition matrix).

[Math. 3]

$$A(\theta) = \begin{bmatrix} -\frac{1}{R_1 C_1} - \frac{1}{R_2 C_1} & \frac{1}{R_2 C_1} & 0 \\ \frac{1}{R_2 C_1} & -\frac{1}{R_2 C_2} - \frac{1}{R_Z C_2} & \frac{1}{R_Z C_2} \\ 0 & -\frac{1}{R_Z C_Z} - \frac{1}{R_{OZ} C_Z} & \frac{1}{R_{win} C_Z} \end{bmatrix}$$

Further, B ($\theta$) is represented by the following parameter matrix (state-transition matrix).

[Math. 4]

$$B(\theta) = \begin{bmatrix} \frac{1}{R_1 C_1} & 0 & \frac{\alpha}{C_1} & 0 & 0 & 0 \\ 0 & 0 & \frac{\beta}{C_2} & 0 & 0 & 0 \\ \frac{1}{R_{win} C_Z} & \frac{\rho}{C_Z} & 0 & \frac{\gamma}{C_Z} & \frac{1}{R_{OZ} C_Z} & \frac{\delta}{C_Z} \end{bmatrix}$$

In addition, $\theta$ and C are represented by the following parameter matrices (observed value matrices), respectively.

$$\theta = [R_1 C_1 R_2 C_2 R_Z C_Z R_{OZ} R_{WIN} \alpha \beta \gamma \rho \delta]^T$$

$$C = [0\,0\,1]\,x = [T_1 T_2 T_Z]^T\,u = [T_O Q_{OCC} Q_S Q_{EQP} T_{OZ}\,Q_{HVAC}]^T \quad \text{[Math. 5]}$$

Note that, it is difficult to measure the amount of heat generated by people $Q_{OCC}$ and the amount of heat generated by equipment $Q_{EQP}$, and hence these values may be estimated based on the amount of power consumed (consumption power data) by the equipment located in the room (floor) to be controlled. For example, when power consumption data of the air-conditioning apparatus, the lighting, and the OA equipment can be acquired, the amount of heat generated by equipment $Q_{EQP}$ may be determined by totaling the lighting power consumption and a power consumption Q of the OA equipment.

Further, the amount of heat generated by people $Q_{OCC}$ may also be determined based on the calculation of Equation (6) by multiplying the "amount of heat generated per person" by the "number of people in the room".

$$Q_{OCC} = \text{"Amount of heat generated per person"} * \text{"Number of people in the room"} \quad (6)$$

In addition, the number of people in the room may be determined by counting the number of people with a sensor installed in the building. Alternatively, the number of people in the room may be calculated by, like in Equation (7), giving a probability density function P (x) with respect to the power consumption Q of the OA equipment and a "maximum number of people in the room", and then producing an estimate from an actually measurement value (or a predicted value) of the power consumption Q of the OA equipment.

$$\text{Number of people in the room} = \text{"Maximum number of people in the room"} * P(x) \quad (7)$$

Note that, when the power consumption Q of the OA equipment cannot be acquired, representative data of the amount of heat generated by people $Q_{OCC}$ and the amount of heat generated by equipment $Q_{EQP}$ may be employed depending on how the target building is used.

On the other hand, if the amount of heat removed by air conditioning $Q_{HVAC}$ can be acquired by the air-conditioning apparatus operating data acquisition unit 5, that value may be used as is. However, if the amount of heat removed by air conditioning $Q_{HVAC}$ cannot be acquired, the amount of heat can be calculated using the air-conditioning apparatus characteristic data 7. For example, as the air-conditioning apparatus characteristic data 7, a relational expression of a compressor frequency f, an evaporating temperature ET, a condensing temperature CT, and the heat supply amount of the outdoor unit of the air-conditioning apparatus 2 may be prepared as follows.

[Math. 6]

$$Q_i(t) = a_q f_i (CT - ET) + b_q f_i + c_q \quad (8)$$

In the above-mentioned relational expression, coefficients a, b, and c each have a different value based on the type of compressor. Note that, the coefficients a, b, and c may each be determined from actual measured values. Further, the relationship among the compressor frequency f, the evaporating temperature ET, the condensing temperature CT, and the heat supply amount of the outdoor unit may also be calculated using an air-conditioning apparatus model modeled on a refrigerant circuit of the outdoor unit.

Note that, the amount of solar radiation $Q_S$ and the outside air temperature $T_O$ are data (actual measured values) acquired by the meteorological data acquisition unit 4 from the meteorological data distribution company 1. Further, the indoor temperature $T_Z$ and the adjacent room temperature $T_{OZ}$ are data (actual measured values) acquired by the air-conditioning apparatus operating data acquisition unit 5 from each air-conditioning apparatus 2.

Based on these pieces of data and Equations (4) and (5), parameter matrices A ($\theta$), B ($\theta$), and C ($\theta$) can be identified. The procedure for identifying the parameter matrices A ($\theta$), B ($\theta$), and C ($\theta$) is as described below in Steps A1 to A7.

First, an initial value vector θ and a state vector X of a learning parameter are determined (Step A1), and based on the initial value vector θ, state-transition matrices A (θ) and B (θ), and an observed value matrix C (θ) are defined (Step A2).

Next, a state vector X (k) is generated using the state-transition matrices A (θ) and B (θ), an observed value vector u (k) at t=k, and a state estimation value X (k−1) at t=k−1 (Step A3).

Then, a system response vector Y' (k+1) is estimated from the observed value matrix C (θ) and the state vector X (k) (Step A4).

Next, a difference e (θ, k) between the observed value (actual measured value) and the predicted value is calculated using the following equation (Step A5).

$$e(\theta,k)=Y(k)-Y'(k-1)$$

Then, a parameter matrix E (A) is determined as shown by Equation (9) by executing Steps A2 to A5 for all observed values (Step A6).

$$E(\theta)=[e(\theta,1),e(\theta,2),e(\theta,3),\ldots e(\theta,n)] \quad (9)$$

In Equation (9), n denotes the number of observed values.

Lastly, a parameter vector θ* for minimizing the norm of the parameter matrix E (θ) is determined using a nonlinear least squares method as shown by Equation (10) (Step A7).

$$\theta^*=\mathrm{argmin}(E(\theta)^*E(\theta)) \quad (10)$$

Note that, in Steps A3 to A7, a maximum likelihood method may be used instead of the nonlinear least squares method.

Further, a subspace method for directly determining the state-transition matrices A and B and the observed value matrix C may also be used by matrix decomposition of a set u of the observed value vector u (k).

The thermal characteristic parameter 11 is determined in the manner described above by the thermal characteristic parameter setting unit 10.
(Step S26)

Returning again to FIG. 2, the air-conditioning system control apparatus 3 stores the thermal characteristic parameter 11 determined by the thermal characteristic parameter setting unit 10 in the data storage unit 8.
(Step S27)

Next, after the thermal characteristic parameter 11 is set, the humidity characteristic parameter setting unit 12 sets the humidity characteristic parameter 13.
[Humidity Characteristic Parameter Setting]

The setting of the thermal characteristic parameter 11 by the humidity characteristic parameter setting unit 12 is described below in more detail.

Figure 4:
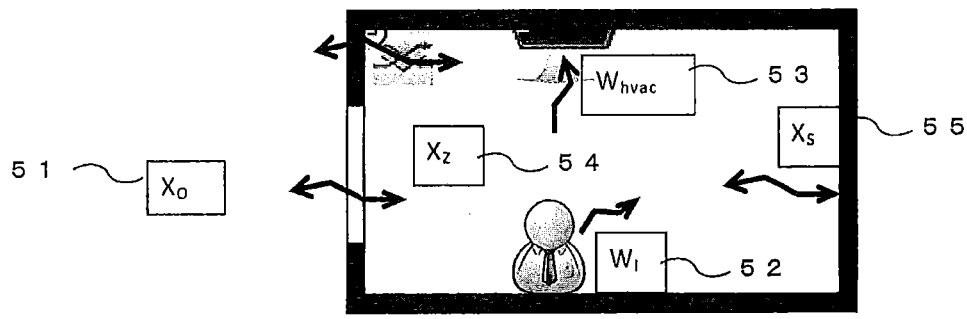
FIG. 4 is a diagram illustrating a building humidity model of the air-conditioning system control apparatus according to Embodiment 1 of the present invention.

FIG. 4 is a diagram illustrating a building humidity model of the air-conditioning system control apparatus according to Embodiment 1 of the present invention.

In FIG. 4, an example of each of the factors to be considered in the building humidity model 12a is schematically illustrated. For example, in the building humidity model 12a, an outside air absolute humidity ($X_O$) 51, an amount of moisture produced indoors ($W_i$) 52, a dehumidification amount ($W_{HVAC}$) 53 during cooling by the air-conditioning apparatus, an indoor absolute humidity ($X_Z$) 54, and a surface absolute humidity ($X_S$) 55, which is an absorption and desorption level of moisture of walls are considered as factors influencing humidity. Note that, the meaning of the term "walls and the like" as used herein includes structures forming the air-conditioned space, including the walls, the floor, and the ceiling, as well as objects arranged in the air-conditioned space (furniture etc.).

Equation (11) is derived by expressing the relational expression of the above-mentioned factors influencing the humidity as a theoretical equation (moisture balance equation).

[Math. 7]

$$\rho V \frac{dX_Z}{dt} = \rho G_v(X_o - X_Z) + \sigma W_i + \omega W_{HVAC} + \sum a_j A_j(X_{s,j} - X_Z) + \rho G_d(X_o - X_Z) \quad (11)$$

In Equation (11), $X_Z$ represents the indoor absolute humidity (kg/kg'), V represents an indoor volume (m$^3$), $X_O$ represents the outside air absolute humidity (kg/kg'), $G_V$ represents a rate of ventilation (m$^3$/sec), $W_i$ represents the amount of moisture produced indoors (kg/sec), $W_{HVAC}$ represents the dehumidification amount (kg/sec) during cooling by the air-conditioning apparatus, a represents a surface humidity transfer rate (kg/m$^2$/h/(kg/kg')), A represents a surface area (m$^2$), $X_S$ represents a surface absolute humidity (kg/kg'), $G_d$ represents a draft rate (m$^3$/sec), ρ represents an air density (kg/m$^3$), σ represents a correction coefficient (−) of the amount of moisture produced indoors, ω represents a correction coefficient (−) of the dehumidification amount produced during cooling by the air-conditioning apparatus, and j represents the number of surfaces to be considered regarding the absorption and desorption level of moisture.

The first term on the right side of Equation (11) represents the change in moisture by ventilation, the second term represents the amount of moisture produced indoors, the third term represents the dehumidification amount produced during cooling by the air-conditioning apparatus 2, the fourth term represents the absorption and desorption level of moisture of walls and the like, and the fifth term represents the change in moisture due to drafts. A method of calculating each term on the right side of Equation (11) is described below.
(Change in Moisture by Ventilation)

Regarding the first term on the right side of Equation (11), namely, the change in moisture by ventilation, the outside air absolute humidity ($X_O$) 51 can be calculated based on the outside air temperature and the outside air relative humidity, which are acquired by the meteorological data acquisition unit 4. When a total heat exchanger is installed, the absolute humidity of the air supplied to the total heat exchanger is used instead of the outside air relative humidity. The absolute humidity of the air supplied to the total heat exchanger may be acquired using sensor information when the total heat exchanger includes a sensor, or may be calculated in accordance with Equation (12) using the efficiency of the total heat exchanger when the total heat exchanger does not include a sensor.

[Math. 8]

$$X_{SA}=(1-\eta_E)X_o+\eta_E X_Z+0.0004(\eta_T-\eta_E)(T_o-T_Z) \quad (12)$$

In Equation (12), $X_{SA}$ represents the absolute humidity (kg/kg') of the air supplied to the total heat exchanger, $\eta_E$ represents an enthalpy exchange efficiency (−) of the total heat exchanger, $\eta_T$ represents a temperature exchange efficiency (−) of the total heat exchanger, $T_O$ represents the outside air temperature (K), and $T_Z$ represents the indoor temperature (K).

The rate of ventilation $G_V$ may be set based on the specification of the total heat exchanger. Alternatively, if the rate of ventilation $G_V$ is unknown, the rate of ventilation may be set based on the number of ventilation cycles for the indoor volume V or based on the number of people in the room.

(Amount of Moisture Produced Indoors)

The second term on the right side of Equation (11), namely, the amount of moisture produced indoors, is determined by multiplying the amount of moisture produced per person by the number of people in the room. Similar to the case for the thermal characteristic parameter setting unit 10, the number of people in the room is counted with a sensor and the like or calculated as an estimate. Alternatively, when there is no actual measured value, the number of people in the room may be set based on a weekday/holiday schedule.

(Dehumidification Amount Produced During Cooling by the Air-Conditioning Apparatus)

The third term on the right side of Equation (11), namely, the dehumidification amount produced during cooling by the air-conditioning apparatus is calculated using Equation (13).

[Math. 9]

$$W_{HVAC} = \rho G_{h\_out}(X_{h\_out} - X_Z) \tag{13}$$

In Equation (13), $G_{h\_out}$ represents an amount of blown air (m³/sec) and $X_{h\_out}$ represents the absolute humidity (kg/kg') of the blown air.

The absolute humidity $X_{h\_out}$ of the blown air can be calculated based on the temperature of the blown air and the relative humidity of the blown air. When the temperature of the blown air and the relative humidity of the blown air are measured with sensors, the sensor-measured values are used. When the temperature of the blown air and the relative humidity of the blown air are not measured, these values may be estimated based on the operating data of the air-conditioning apparatus 2. If the surface of the heat exchanger in the indoor unit of the air-conditioning apparatus 2 is wet (has a relative humidity of 100%), the relative humidity of the blown air can be estimated as 95%. Further, the temperature of the blown air may be determined using Equation (14) based on the efficiency of the heat exchanger in the indoor unit and the heat exchanger inlet pipe temperature.

[Math. 10]

$$T_{h\_out} = (1-\tau)T_{HEX\_in} + \tau \cdot T_{h\_in} \tag{14}$$

In Equation (14), $T_{h\_out}$ represents the temperature (K) of the blown air, $T_{HEX\_in}$ represents the heat exchanger inlet pipe temperature (K), and T represents the indoor unit heat exchanger efficiency (–).

When a sensor is installed in the indoor unit of the air-conditioning apparatus 2, the sensor-measured value may be used for the amount of blown air $G_{h\_out}$. When a sensor is not installed, a catalog value may be used for the amount of blown air $G_{h\_out}$. When the catalog value is unknown, the dehumidification amount produced by the air-conditioning apparatus 2 may be calculated using Equation (15).

[Math. 11]

$$W_{HVAC} = H_{HVAC} \cdot \frac{X_{h\_in} - X_{h\_out}}{h_{h\_in} - h_{h\_out}} \tag{15}$$

In Equation (15), $H_{HVAC}$ represents the total amount of heat (kW) exchanged by the air-conditioning apparatus, $X_{h\_in}$ represents the absolute humidity (kg/kg') of the suction air, $h_{h\_in}$ represents a specific enthalpy (kJ/kg') of the suction air, and $h_{h\_in}$ represents an enthalpy (kJ/kg') of the suction air.

The total amount of heat $H_{HVAC}$ exchanged by the air-conditioning apparatus can be determined based on the air-conditioning apparatus characteristic data 7 and the air-conditioning apparatus operating data. For example, using Equation (8) described above, the total amount of heat $H_{HVAC}$ exchanged by the air-conditioning apparatus can be determined based on the compressor frequency f, the evaporating temperature ET, and the condensing temperature CT. The specific enthalpy $h_{h\_out}$ of the blown air and the specific enthalpy $h_{h\_in}$ of the suction air may be calculated using Equation (16).

[Math. 12]

$$h = C_{pa} \cdot T + (C_{pw} \cdot T + r0)X \tag{16}$$

In Equation (16), h represents the specific enthalpy (kJ/kg'), $C_{pa}$ represents a dry air specific heat (kJ/kg/K), r0 represents the latent heat of vaporization (kJ/kg), T represents the temperature (K), and X represents the absolute humidity (kg/kg').

As a suction air temperature, the indoor temperature included in the air-conditioning apparatus operating data or the suction air temperature may be used. The temperature of the blown air $T_{h\_out}$ may be calculated using Equation (14) based on the efficiency of the indoor unit heat exchanger and the heat exchanger inlet pipe temperature. The absolute humidity of the blown air $X_{h\_out}$ may be calculated based on the temperature of the blown air and the relative humidity of the blown air on the assumption that the relative humidity of the blown air is 95%.

(Moisture Absorbed and Desorbed by the Walls and the Like)

To calculate the fourth term on the right side of Equation (11), namely, the moisture absorbed and desorbed by the walls and the like, consideration needs to be given to the walls and furniture. Strictly speaking, the indoor moisture balance of each surface needs to be considered similarly to the calculation of the fourth term on the right side of Equation (11). However, because it is difficult to individually consider each wall and piece of furniture, in this example, Equation (17) is employed for this calculation using a representative surface absolute humidity and a representative moisture transfer coefficient.

[Math. 13]

$$\Sigma a_i A_i (X_{s,i} - X_Z) = \alpha_X (X_s - X_Z) \tag{17}$$

In Equation (17), $X_S$ represents the surface absolute humidity (kg/kg'), $X_Z$ represents the indoor absolute humidity (kg/kg'), and $\alpha_X$ represents a representative surface moisture transfer coefficient (kg/sec/(kg/kg')).

The surface absolute humidity $X_S$ is determined based on a moisture balance between the air contacting the surface and the surface material interior. When the surface temperature can be acquired, the surface absolute humidity $X_S$ can be calculated by multiplying a surface relative humidity $RH_s$ by a saturated water vapor amount $X_{sat}$ that is determined from the surface temperature, as shown in Equation (18).

[Math. 14]

$$X_S = X_{sat} \cdot RH_s \tag{18}$$

In Equation (18), $X_{sat}$ represents the saturated water vapor amount (kg/kg') and $RH_s$ represents the surface relative humidity (-).

Figure 5:
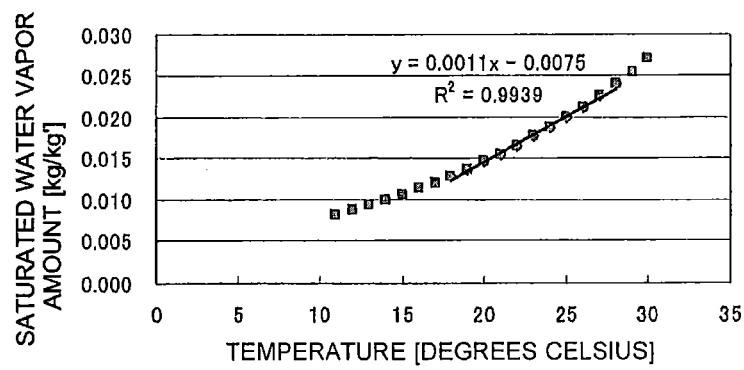
FIG. 5 is a graph showing a relationship between a saturated water vapor amount and temperature.

FIG. 5 is a graph showing a relationship between the saturated water vapor amount and the temperature.

As shown in FIG. 5, although the saturated water vapor amount $X_{sat}$ and the temperature are in a nonlinear relationship, by limiting the temperature range, the relationship may also be estimated to be linear as shown by Equation (19).

[Math. 15]

$$X_{sat} = a \cdot T_s + b \tag{19}$$

In Equation (19), $T_s$ represents the surface temperature (K), a represents a slope of a saturated water vapor amount approximation curve (kg/kg'/K), and b represents a segment of the saturated water vapor amount approximation curve (kg/kg').

For example, a=0.0011 and b=0.0075 may be used for coefficients a and b. For the surface temperature $T_s$, the surface temperature $T_2$ of the indoor side of the exterior wall, which is one of the thermal characteristic parameters 11, may be used.

(Change in Moisture Due to Drafts)

For the change in moisture due to drafts, which is the fifth term on the right side of Equation (11), drafts produced by the opening and closing of doors, and drafts that are constantly occurring are considered. The draft amount that is constantly occurring can be calculated using a draft ventilation count for the indoor volume. A draft amount $G_d$ produced by the opening and closing of doors can be determined using Equation (20) based on the number of people in the room used by the thermal characteristic parameter setting unit 10.

[Math. 16]

$$G_d = \upsilon \cdot OCC \tag{20}$$

In Equation (20), $\upsilon$ represents the draft amount per person in the room (m³/person/sec) produced by the opening and closing of doors and OCC represents the number of people in the room.

Next, the humidity characteristic parameter setting unit 12 including the building humidity model 12a is described in more detail.

The humidity characteristic parameters 13 in Equation (11) include the indoor volume V, the surface relative humidity $RH_s$, the representative surface moisture transfer coefficient $\alpha_X$, the correction coefficient $\sigma$ of the amount of moisture produced indoors, and the correction coefficient $\omega$ of the dehumidification amount produced during cooling by the air-conditioning apparatus.

The indoor volume V represents the volume of the indoor space in which the air-conditioning apparatus 2 is installed. The indoor volume V may be set by the user calculating the volume from the design drawings and the like of the target building, for example. Alternatively, when the drawings are not available, the indoor volume V may be determined and set by the humidity characteristic parameter setting unit 12 performing the following calculation based on the thermal characteristic parameter 11.

The indoor heat capacity $C_Z$ in Equation (3) can be rewritten as follows.

[Math. 17]

$$C_z = \rho C_{pw} V \tag{21}$$

In Equation (21), $\rho$ represents the air density (kg/m³) and $C_{pw}$ represents a wet air specific heat (kJ/kg/K).

Because the indoor heat capacity $C_Z$ is one of the thermal characteristic parameters 11, the indoor heat capacity $C_Z$ is known from Step S25 in FIG. 2. Therefore, the indoor volume V can be calculated using the indoor heat capacity $C_Z$ determined in Step S25, the air density $\rho$, which is an air physical property value, and the wet air specific heat $C_{pw}$.

Assuming that the walls are designed so that condensation does not form on their surfaces, the surface relative humidity $RH_s$ is not a value far from the indoor relative humidity. By assuming that air-conditioning is set so that the indoor relative humidity is 40% to 60%, the middle value of 50% may be taken as the surface relative humidity $RH_s$.

The representative surface moisture transfer coefficient $\alpha_X$ depends on surface members and a surface area. It is very difficult to acquire the physical property values and the area of each surface member.

On the other hand, a law of similarity holds between heat transfer and moisture transfer of a substance. For example, the relationship of Equation (22) holds between an indoor-side surface convection heat transfer coefficient $a_T$ and the representative surface moisture transfer coefficient $\alpha_X$.

[Math. 18]

$$\alpha_X = a_T A_S = \frac{0.93}{R_Z C_Z} \tag{22}$$

In Equation (22), $a_T$ represents the indoor-side surface convection heat transfer coefficient (kW/m²/K), $A_s$ represents the surface area (m²), $R_Z$ represents the indoor side thermal resistance (K/kW), and $C_Z$ represents the indoor heat capacity (kJ/K).

Because the indoor side thermal resistance $R_Z$ and the indoor heat capacity $C_Z$ are each one of the thermal characteristic parameters 11, these values are already determined by the thermal characteristic parameter setting unit 10. Therefore, the representative surface moisture transfer coefficient $\alpha_X$ can be determined using Equation (22).

For the correction coefficient $\sigma$ of the amount of moisture produced indoors, the amount of moisture generated by people is assumed to be in similarity relation with the amount of heat generated by people, and the correction coefficient $\rho$ of the heat generated by people in the building thermal model is used.

For the correction coefficient $\omega$ of the dehumidification amount produced during cooling by the air-conditioning apparatus, the correction coefficient $\omega$ is assumed to be in similarity relation with the amount of heat removed by air conditioning $Q_{HVAC}$, and the correction coefficient $\delta$ of the amount of heat removed (supplied) by air conditioning in the building thermal model is used.

Thus, the humidity characteristic parameter 13 can be set based on the thermal characteristic parameter 11.

(Step S28)

Returning again to FIG. 2, the air-conditioning system control apparatus 3 stores the humidity characteristic parameter 13 determined by the humidity characteristic parameter setting unit 12 in the data storage unit 8.

(Step S29)

Next, based on a user request, the air-conditioning system control apparatus 3 determines whether or not to continue generating (preparing) the control data 17 of the air-conditioning apparatus 2. When it is determined not to continue preparing the control data 17 (i.e., NO), the processing routine of FIG. 2 is finished. Note that, Step S29 may be omitted, and the control data 17 may continue to be generated regardless of a user request.
(Step S30)

On the other hand, when it is determined based on a user request in Step S29 to continue preparing control values of the air-conditioning apparatus 2 (i.e., YES), calculation conditions, such as a target building number and a learning period, are set by a user operation.
(Step S31)

The control data generation unit 15 acquires the thermal characteristic parameter 11 and the humidity characteristic parameter 13 of the target building, the building thermal model 10a and the building humidity model 12a, and the input data for prediction 14 required for prediction.

Note that, the input data for prediction 14 basically includes the same items as the input data for parameter setting 9, and the input data for prediction 14 may also include future prediction values.
(Step S32)

Based on the thermal characteristic parameter 11 and the humidity characteristic parameter 13 of the target building, the building thermal model 10a and the building humidity model 12a, the input data for prediction 14 required for prediction, and the air-conditioning apparatus characteristic data 7, the control data generation unit 15 generates the control data 16 of the air-conditioning apparatus 2 that enables the air-conditioning apparatus 2 to remove a required thermal load so that, for the thermal load predicted by the thermal load prediction unit 15a, the power consumption of the air-conditioning apparatus 2 is at a minimum and the indoor temperature and humidity are each within a comfortable range.

The control data 16 includes at least an operation stop time of the air-conditioning apparatus 2, and may also include the amount of heat supplied (or removed) by each air-conditioning apparatus 2. In particular, in the case of a building multi-air conditioner, a package air conditioner, or a room air conditioner, the control data 16 may include an operating frequency or an operating frequency upper limit value of the outdoor unit and a setting temperature of the indoor unit.

[Generation of Control Data]

A calculation example of the control data generation unit 15 is described below in more detail.

The control values are determined by solving an optimization problem in which the total power consumption of a plurality of air-conditioning apparatus 2 is set as an objective function, and the operating frequency (compressor frequency f) and an operation stop u of the outdoor unit for each air-conditioning apparatus 2 are set as control variables.

[Math. 19]

(Objective Function)

$$\min \sum_t \sum_i P_i(t) \quad (23)$$

(Constraint Equation)

$$P_i(t) = (a_p Q_i(t)^2 + b_p Q_i(t) + c_p) * u_i(t) \quad (24)$$

$$Q_i(t) = (a_q f_i(t)^2 + b_q f_i(t) + c_q) * u_i(t) \quad (25)$$

$$Q_{total}(t) = \sum_i Q_i(t) \quad (26)$$

$$\min T_Z \le T_Z(t) \le \max T_Z \quad (27)$$

$$\min X_z \le Z_z(t) \le \max X_z \quad (28)$$

$$\min Q_i \le Q_i(t) \le \max Q_i \quad (29)$$

In Equations (23) to (29), $P_i$ represents the power consumption (kW) of an outdoor unit i, $Q_i$ represents the heat supply amount (kW) of the outdoor unit i, $u_i$ represents the operation stop [0/1] of the outdoor unit i, $Q_{total}$ represents the indoor thermal load (kW), $T_Z$ represents the indoor temperature (K), $\max T_Z$ represents an upper limit value of the indoor temperature (K), $\min T_Z$ represents a lower limit value of the indoor temperature (K), $X_Z$ represents the indoor absolute humidity (kg/kg'), $\max X_Z$ represents an upper limit value of the indoor absolute humidity (kg/kg'), $\min X_Z$ represents a lower limit value of the indoor absolute humidity (kg/kg'), $\max Q_i$ represents an upper limit value of the heat supply amount of the outdoor unit i (kW), $\min Q_i$ represents a lower limit value of the heat supply amount of the outdoor unit i (kW), and fi represents an operating frequency (Hz) of the outdoor unit i.

Further, $a_p$, $b_p$, and $c_p$ each denote a coefficient when the power consumption of the outdoor unit is approximated by a quadratic function with the heat supply amount of the outdoor unit as a variable. In addition, $a_q$, $b_q$, and $c_q$ each denote a coefficient when the heat supply amount of the outdoor unit is approximated by a quadratic function with the operating frequency of the outdoor unit as a variable.

The operation stop of the outdoor unit, which is a discrete value, is determined by combination optimization. The optimal heat supply amount of the outdoor unit for each combination is determined based on nonlinear optimization. From a very large number of combinations, the combinations are efficiently changed to approach the optimal solution, and the solution giving the minimum objective function from among a limited number of candidates is output as the optimum operation schedule. Examples of the optimization method to be used include dynamic programming or problem space searching in combination optimization, and quadratic programming in nonlinear optimization.

The $Q_{total}(t)$ of Equation (26) is calculated by the thermal load prediction unit 15a. The thermal load prediction unit 15a predicts the indoor thermal load based on the building thermal model 10a in the thermal characteristic parameter setting unit 10, the thermal characteristic parameter 11 determined by the thermal characteristic parameter setting unit 10, and certain input data for prediction 14 stored in the data storage unit 8.

The $T_Z(t)$ of Equation (27) and the $X_Z(t)$ of Equation (28) are calculated by the indoor temperature and humidity prediction unit 15b. The indoor temperature and humidity prediction unit 15b predicts the indoor temperature and humidity based on the thermal characteristic parameter 11 determined by the thermal characteristic parameter setting unit 10, the humidity characteristic parameter 13 determined by the humidity characteristic parameter setting unit 12, the building thermal model 10a and the building humidity model 12a, and certain input data for prediction 14 stored in the data storage unit 8.

(Step S33)

The air-conditioning system control apparatus 3 stores the control data 16 generated by the control data generation unit 15 in the data storage unit 8.

(Step S34)

The control data output unit 6 transmits the control data 16 to the air-conditioning apparatus 2 via the communication unit 100, and finishes the processing routine of FIG. 2. As a result, the air-conditioning apparatus 2 is operated based on the control data 16.

Note that, by registering the calculation conditions of Steps S23 and S30 in advance in the data storage unit 8, Steps S23 to S30 can all be executed automatically.

Thus, in Embodiment 1, the air-conditioning system control apparatus 3 is configured to control the air-conditioning apparatus 2 configured to air-condition the air-conditioned space of the building. The air-conditioning system control apparatus 3 includes the data storage unit 8 for storing the input data for parameter setting 9 including at least meteorological data of the region including the building and operating data of the air-conditioning apparatus 2, the thermal characteristic parameter setting unit 10 including the information on the building thermal model 10a that is based on the heat equation of the air-conditioned space, the thermal characteristic parameter setting unit 10 being configured to determine, based on the input data for parameter setting 9, the thermal characteristic parameter 11, which is the physical parameter of the building thermal model 10a, the humidity characteristic parameter setting unit 12 including the information on the building humidity model 12a that is based on the moisture balance equation of the air-conditioned space, the humidity characteristic parameter setting unit 12 being configured to determine, based on the thermal characteristic parameter 11 and the input data for parameter setting 9, the humidity characteristic parameter 13, which is the physical parameter of the building humidity model 12a, the control data generation unit 15 configured to generate, based on the input data for prediction 14 including at least the input data for parameter setting 9, the building thermal model 10a, the building humidity model 12a, the thermal characteristic parameter 11, and the humidity characteristic parameter 13, the control data 16 of the air-conditioning apparatus 2 that enables the air-conditioning apparatus 2 to remove the required thermal load so that the temperature and humidity of the air-conditioned space are each within the preset range, and the control data output unit 6 configured to transmit the control data 16 to the air-conditioning apparatus 2.

As a result, because the thermal characteristic parameter 11 and the humidity characteristic parameter 13 of an individual building can be automatically set, a thermal load prediction and an indoor temperature and humidity prediction can be made based on physical equations even without installing additional sensors (in particular, a humidity sensor), or even without acquiring a detailed building specification (e.g., window area and roof area).

Further, according to Embodiment 1, the control data generation unit 15 includes the thermal load prediction unit 15a configured to predict the thermal load of the air-conditioned space based on the building thermal model 10a, the building humidity model 12a, the thermal characteristic parameter 11, the humidity characteristic parameter 13, and the input data for prediction 14, and the indoor temperature and humidity prediction unit 15b configured to predict the temperature and humidity of air-conditioning space based on the building thermal model 10a, the building humidity model 12a, the thermal characteristic parameter 11, the humidity characteristic parameter 13, and the input data for prediction 14, in which the control data generation unit 15 is configured to generate the control data 16 of the air-conditioning apparatus 2 that enables the air-conditioning apparatus 2 to remove a required thermal load based on the input data for prediction 14, the thermal load of the air-conditioned space predicted by the thermal load prediction unit 15a, and the temperature and humidity of the air-conditioned space predicted by the indoor temperature and humidity prediction unit 15b so that the temperature and humidity of the air-conditioned space are each within the preset range.

As a result, the accuracy of the temperature and humidity prediction for an individual building is increased, and control data of the air-conditioning apparatus 2 can be generated based on a comfort level that reflects the building characteristics.

Further, the indoor humidity can be accurately estimated and the indoor temperature and humidity can be set not to depart from comfortable ranges even for a room in which a humidity sensor is not installed.

In addition, because the humidity characteristic parameter of an individual building can be automatically estimated, the indoor humidity can be predicted even without installing a humidity sensor.

Further, according to Embodiment 1, the plurality of air-conditioning apparatus 2 is installed in the building, the input data for parameter setting 9 includes the air-conditioning apparatus characteristic data 7 representing the relationship between the power consumption and the heat supply amount of each of the plurality of air-conditioning apparatus 2, and the control data generation unit 15 is configured to generate the control data 16 of each of the plurality of air-conditioning apparatus 2 so that the sum of the heat supply amount of the plurality of air-conditioning apparatus 2 is the thermal load, the temperature and humidity of the air-conditioned space are each within the preset range, and the sum of the power consumption of the plurality of air-conditioning apparatus 2 is at the minimum.

As a result, the total power consumption of the air-conditioning apparatus forming the air-conditioning system can be reduced. Consequently, an air-conditioning system control apparatus 3 can be provided, which is capable of reducing power consumption and achieving a satisfactory level of comfort.

Further, according to Embodiment 1, the building humidity model 12a is based on the moisture balance equation including, as the influencing factors, the change in moisture by ventilation, the amount of moisture produced indoors, the dehumidification amount produced during cooling by the air-conditioning apparatus 2, the absorption and desorption level of moisture of walls and the like, and the change in moisture due to drafts.

As a result, because the main factors influencing change in indoor moisture are considered, the accuracy of the temperature and humidity prediction can be improved.

Further, according to Embodiment 1, the humidity characteristic parameter setting unit 12 determines the representative surface moisture transfer coefficient ($\alpha_x$), which is one of the humidity characteristic parameters 13, based on the law of similarity between heat transfer and moisture transfer, and the indoor side thermal resistance ($R_Z$) and the indoor heat capacity ($C_Z$), which are included in the thermal characteristic parameters 11, and determines the absorption and desorption level of moisture of walls and the like based on the representative surface moisture transfer coefficient ($\alpha_x$).

As a result, because the humidity characteristic parameter 13 of an individual building can be automatically estimated, the indoor humidity can be predicted even without installing a humidity sensor.

Further, according to Embodiment 1, the humidity characteristic parameter setting unit 12 determines the saturated water vapor amount ($X_{sat}$) using the surface temperature ($T_2$) of the indoor side of the exterior wall, which is one of the thermal characteristic parameters 11, determines the surface absolute humidity ($X_S$) based on the saturated water vapor amount ($X_{sat}$), and determines the absorption and desorption level of moisture of walls and the like based on the representative surface moisture transfer coefficient ($\alpha_X$) and the surface absolute humidity ($X_S$).

As a result, because the surface temperature of walls and the like can be determined even without installing a temperature sensor configured to detect the temperature of the walls and the like, the absorption and desorption level of moisture of walls and the like can be calculated in detail, allowing the prediction accuracy of indoor humidity to be improved.

Further, according to Embodiment 1, the humidity characteristic parameter setting unit 12 employs the correction coefficient ($\rho$) of heat generated by people included in the thermal characteristic parameters 11 as the correction coefficient ($\sigma$) for correcting the amount of moisture produced indoors.

As a result, because the humidity characteristic parameter 13 of an individual building can be automatically estimated, the indoor humidity can be predicted even without installing a humidity sensor.

Further, according to Embodiment 1, the humidity characteristic parameter setting unit 12 employs the correction coefficient ($\delta$) of the heat supply amount of the air-conditioning apparatus 2 included in the thermal characteristic parameters 11 as the correction coefficient ($\omega$) for correcting the dehumidification amount produced during cooling by the air-conditioning apparatus 2.

As a result, because the humidity characteristic parameter of an individual building can be automatically estimated, the indoor humidity can be predicted even without installing a humidity sensor.

Embodiment 2

In Embodiment 1, when the absorption and desorption level of moisture of walls and the like of the building humidity model 12a is to be calculated, the surface absolute humidity $X_S$ of the materials of the walls and the like is determined based on the relationship between the saturated water vapor amount $X_{sat}$ at the surface temperature $T_s$ of the materials of the walls and the like and the surface relative humidity $RH_s$. However, the absorption and desorption level of moisture of walls and the like may also be calculated using a moisture balance equation of the material interior of the walls and the like.

Figure 6:
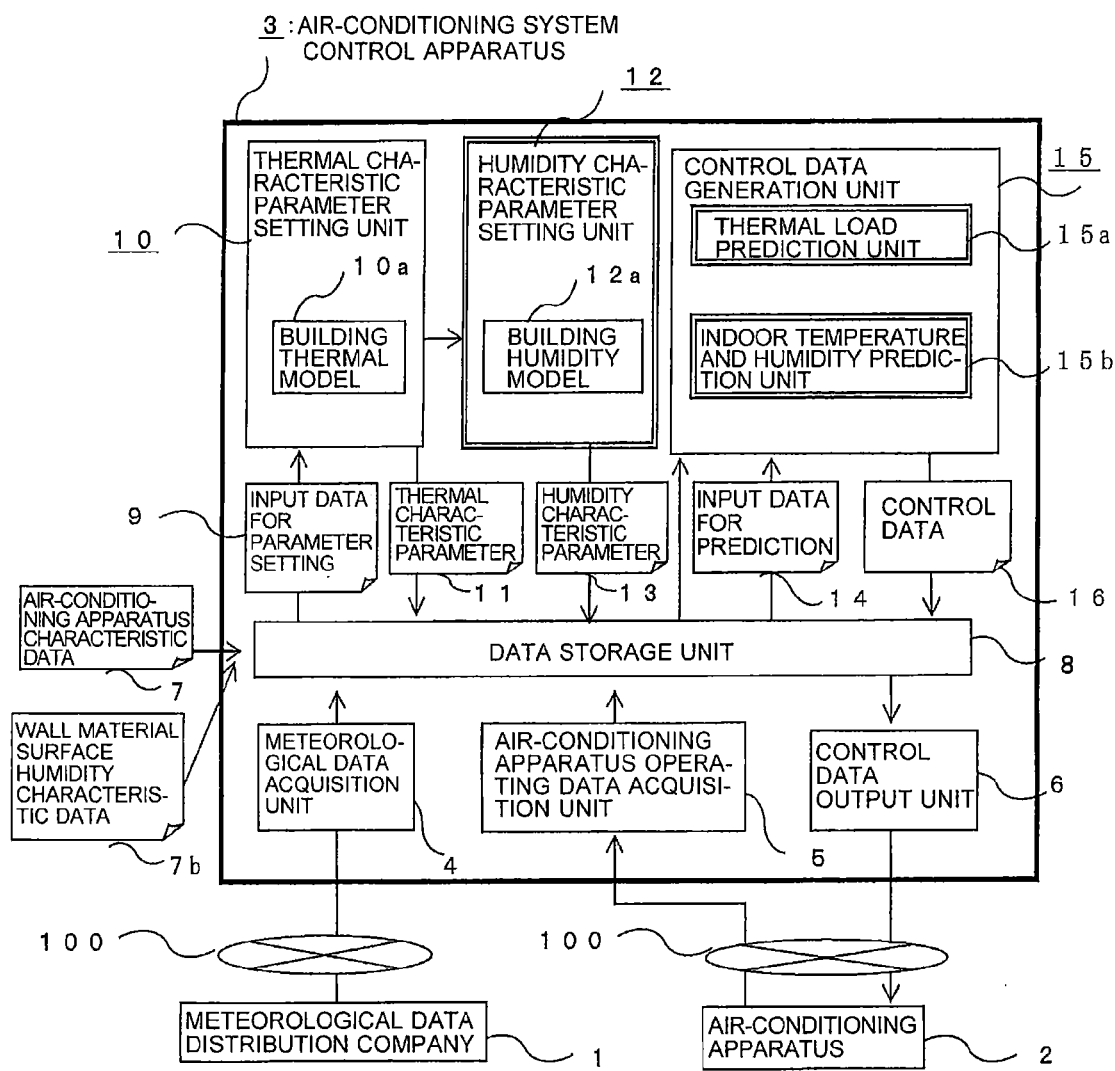
FIG. 6 is a diagram illustrating a configuration of an air-conditioning system control apparatus according to Embodiment 2 of the present invention.

FIG. 6 is a diagram illustrating a configuration of an air-conditioning system control apparatus according to Embodiment 2 of the present invention.

As illustrated in FIG. 6, in addition to the components of Embodiment 1, the air-conditioning system control apparatus 3 according to Embodiment 2 registers (stores) wall material surface humidity characteristic data 7b representing a moisture balance equation of the material interior of the walls and the like in the data storage unit 8.

Note that, other components are the same as those in Embodiment 1, and hence parts that are the same as in Embodiment 1 are denoted using the same reference signs. Differences of Embodiment 2 with Embodiment 1 are described below.

Moisture balance equations for the material interior of the walls and the like are shown in Equations (30) to (32). Equation (32) is a boundary condition at the surface.

[Math. 20]

$$(\Phi \rho + \kappa)\frac{\partial X}{\partial t} - \upsilon \frac{\partial T}{\partial t} = \lambda \frac{\partial^2 X}{\partial n^2} \qquad (30)$$

$$\kappa = \rho_s \frac{\partial \theta}{\partial X} \quad \upsilon = -\rho_s \frac{\partial \theta}{\partial T} \qquad (31)$$

Boundary Condition $$-\lambda \frac{\partial X}{\partial n} = a_s(X_Z - X_s) \qquad (32)$$

In this equation, $\varphi$ represents a material porosity ($m^3/m^3$), $\lambda$ represents a moisture conductivity (kg/m/sec/(kg/kg')), n represents a thickness (m), $\theta$ represents a moisture content (kg/kg), $\rho_s$ represents a material density ($kg/m^3$), and $a_s$ represents a moisture transfer coefficient ($kg/m^2$/sec/(kg/kg')).

Assuming that the gaps in the materials of the walls and the like are sufficiently small, and assuming a thickness of the wall that has an influence on fluctuations in the indoor absolute humidity $X_Z$ to be L (m), Equations (30) to (32) can be expressed by Equation (33).

[Math. 21]

$$L\rho_s \frac{\partial \theta}{\partial X}\frac{dX_s}{dt} + L\rho_s \frac{\partial \theta}{\partial T}\frac{dT_s}{dt} = a_s(X_Z - X_s) \qquad (33)$$

It is assumed that the following equations are satisfied.

[Math. 22]

$$C_{\theta X} = \rho_s V_s \frac{\partial \theta}{\partial X}$$

$$C_{\theta T} = \rho_s V_s \frac{\partial \theta}{\partial T}$$

$$\alpha_X = a_s A_s$$

Equation (33) can be expressed by Equation (34).

[Math. 23]

$$\frac{dX_s}{dt} = \frac{\alpha_X(X_Z - X_s)}{C_{\theta X}} - \frac{C_{\theta T}}{C_{\theta X}}\frac{dT_s}{dt} \qquad (34)$$

In Equations (33) and (34), $C_{\theta X}$ represents a rate of change in moisture content with respect to an absolute humidity gradient (kg/(kg/kg')), $C_{\theta T}$ represents a rate of change in moisture content with respect to a surface temperature gradient (kg/K), $V_s$ represents a material volume ($m^3$), and $A_s$ represents a material surface area ($m^2$).

By simultaneously solving Equation (11) and Equation (34), the building humidity model 12a can be expressed in terms of moisture transfer between the material surface and the room interior.

In summary, the building humidity model 12a according to Embodiment 2 can be expressed by Equations (35) and (36).

[Math. 24]

$$\rho V \frac{dX_Z}{dt} = \rho G_v(X_o - X_Z) + \sigma W_i + \omega W_{HVAC} + \alpha_X(X_S - X_Z) + \rho G_d(X_o - X_Z) \quad (35)$$

$$\frac{dX_s}{dt} = \frac{\alpha_X(X_Z - X_s)}{C_{\theta X}} - \frac{C_{\theta T}}{C_{\theta X}} \frac{dT_s}{dt} \quad (36)$$

By substituting the initial values for the indoor absolute humidity $X_Z$ and the surface absolute humidity $X_S$ into Equations (35) and (36), and successively solving these equations, the indoor absolute humidity $X_Z$ can be determined.

The left side and the first to third terms and the fifth term on the right side of Equation (35) are the same as the left side and the corresponding terms in Equation (11), and hence can be determined in the same manner as in Embodiment 1. The indoor absolute humidity $X_Z$ as the fourth term on the right side of Equation (35) can be calculated from Equation (36). The representative surface moisture transfer coefficient $\alpha_X$ in Equation (36) may be determined in the same manner as in Embodiment 1.

The rate of change in moisture content with respect to an absolute humidity gradient $C_{\theta X}$ and the rate of change in moisture content with respect to a surface temperature gradient $C_{\theta T}$ can be calculated using the material density $\rho_S$, the material volume $V_S$, and a moisture content curve. For these factors, physical property values of the members are registered in advance in the data storage unit 8 as wall material surface humidity characteristic data 7b. The material volume $V_S$ may be determined based on the indoor volume V determined in Embodiment 1. The surface temperature $T_S$ can be calculated using the building thermal model 10a.

Thus, in Embodiment 2, the building humidity model 12a is based on a moisture balance equation including, as influencing factors, the change in moisture by ventilation, the amount of moisture produced indoors, the dehumidification amount produced during cooling by the air-conditioning apparatus 2, the absorption and desorption level of moisture of walls and the like, and the change in moisture due to drafts. Further, the absorption and desorption level of moisture of walls and the like is based on the moisture balance equation of a material interior of a structure.

As a result, the indoor absolute humidity can be calculated in consideration of moisture transfer between the material interior and the air on the material surface of the walls and the like. Therefore, because the absorption and desorption level of moisture of the walls and the like is determined in detail, the prediction accuracy can be improved.

Further, in Embodiment 2, the building humidity model 12a expresses moisture transfer between a material surface of the structure and the air-conditioned space using a rate of change in moisture content with respect to an absolute humidity gradient ($C_{\theta X}$), which is the rate of change in the moisture content of the material interior of the structure with respect to the absolute humidity, and a rate of change in moisture content with respect to a surface temperature gradient ($C_{\theta T}$), which is the rate of change in the moisture content of the material interior of the structure with respect to the surface temperature.

As a result, because the moisture absorbed and desorbed by the walls and the like can be calculated in detail, the accuracy of the temperature and humidity prediction can be improved.

Embodiment 3

(Variations in Objective Function and Constraint Conditions)

The differences of Embodiment 3 of the present invention from Embodiment 1 and Embodiment 2 are in the objective function and the constraint conditions in the calculation examples of the control data generation unit 15. The objective function is first described below, followed by a description of the constraint conditions.

(Variations in Objective Function)
(Functional Configuration Relating to Added Objective Function)

In Embodiment 1 and Embodiment 2, the total power consumption of a plurality of air-conditioning apparatus 2 is employed as the objective function. However, the present invention is not limited to this. For example, in the calculation of the control data 16 generated by the control data generation unit 15 in Step S32, as an objective function (evaluation index), a function including the running cost of the air-conditioning apparatus 2 may be employed. In this case, the power charges per time period or another index may be set as necessary.

Further, to employ an evaluation index considering the comfort level, an evaluation index (objective function) like an evaluation index G shown in Equation (37), for example, that combines a deviation in indoor temperature from a set temperature (a difference value between the set temperature and the indoor temperature), a deviation in indoor humidity from a set humidity (a difference value between the set humidity and the indoor humidity), a rate of change over time in indoor temperature, and a rate of change over time in indoor humidity with the power consumption and the running cost of the air-conditioning apparatus 2 may be set. For example, to reduce power consumption and running cost while suppressing frequent fluctuations in the indoor temperature, an optimum control command can be determined by setting $\alpha_1$, $\alpha_5$, and $\alpha_6$ and $G_1$, $G_5$, and $G_6$ of Equation (37) as the evaluation index.

[Math. 25]

$$G = \alpha_1 \times G_1 + \alpha_2 \times G_2 + \alpha_3 \times G_3 + \alpha_4 \times G_4 \alpha_5 \times G_5 + \alpha_6 \times G_6 \quad (37)$$

In this equation, $G_1$ represents the power consumption of the air-conditioning apparatus 2, $G_2$ represents the running cost of the air-conditioning apparatus 2, $G_3$ represents the mean square value of the deviation in the indoor temperature from the set temperature, $G_4$ represents the mean square value of the deviation in the indoor humidity from the set humidity, $G_5$ represents the mean square value of the rate of change over time in indoor temperature, $G_6$ represents the mean square value of the rate of change over time in indoor humidity, and $\alpha_1$ to $\alpha_6$ each represent a weighting coefficient. However, the mean square values of $G_3$ to $G_6$ do not need to be incorporated into the evaluation index. For example, for $G_3$ and $G_4$, the evaluation index considering the maximum value of the absolute value of the deviation may be used. Further, for $G_5$ and $G_6$, the evaluation index considering the maximum value of the absolute value of the rate of change over time may be used.
(Effects Relating to Added Objective Function)

In the above-mentioned configuration, an evaluation index not merely minimizes the power consumption and the running cost of the air-conditioning apparatus 2, but also includes the comfort level, and thus, the optimum control command for the air-conditioning apparatus 2 can be determined in consideration of the balance between reduced power consumption and the comfort level.
(Variations in Constraint Conditions)
(Case in which Constraint Condition is Added to Rate of Change Over Time in Indoor Temperature)
(Function Configuration Relating to Constraint on Rate of Change Over Time in Indoor Temperature)

Further, in Embodiment 1 and Embodiment 2, the indoor temperature being within a preset range is employed as a constraint condition (constraint equation) relating to the indoor temperature. In addition, the rate of change over time in indoor temperature being maintained within a preset range for the rate of change over time in temperature may be added to the constraint conditions. In other words, the condition that the rate of change over time in indoor temperature is not to exceed an upper limit value for the rate of change over time in indoor temperature may also be employed as a constraint condition. For example, the constraint that the rate of change over time in indoor temperature is 0.2 [degrees Celsius/5 minutes or less] is set.
(Effects Relating to Constraint on the Rate of Change Over Time in Indoor Temperature)

As a result, the air-conditioning system control apparatus 3 is capable of avoiding control of the air-conditioning apparatus 2 that causes a sudden change in the temperature, and hence the comfort level is further improved.
(Case in which Constraint Condition is Added to Rate of Change Over Time in Indoor Humidity)
(Function Configuration Relating to Constraint on Rate of Change Over Time in Indoor Humidity)

Further, in Embodiment 1 and Embodiment 2, the indoor humidity being within a preset range is employed as a constraint condition relating to the indoor humidity. In addition, the rate of change over time in indoor humidity being maintained within a preset range for the rate of change over time in humidity may be added to the constraint conditions. In other words, the condition that the rate of change over time in indoor humidity is not to exceed an upper limit value for the rate of change over time in indoor humidity may also be employed as a constraint condition. For example, the constraint that the rate of change over time in indoor humidity is 0.2 [%/5 minutes or less] is set.
(Effects Relating to Constraint on the Rate of Change Over Time in Indoor Humidity)

As a result, the air-conditioning system control apparatus 3 is capable of avoiding control of the air-conditioning apparatus 2 that causes a sudden change in the humidity, and hence the comfort level is further improved.
(Case in which Constraint Condition is Added to Power Consumption of Air-Conditioning Apparatus 2)
(Function Configuration Relating to Constraint on Power Consumption)

Further, an upper limit value of the power consumption may be added to the constraint conditions by adding the condition that the power consumption of the air-conditioning apparatus 2 is to be maintained at less than or equal to a preset upper limit value of the power consumption. For example, in the air-conditioning system control apparatus 3, a constraint is added to the power consumption by adding the condition that the upper limit value of the power consumption is to be 10 [kW] or less.

(Effects Relating to Constraint on Power Consumption)

As a result, because the air-conditioning system control apparatus 3 can control peak power and contracted power, the user's air-conditioning costs can be reduced.
(Case in which Constraint Condition is Added to Number of Starts and Stops of Air-Conditioning Apparatus 2)
(Function Configuration Relating to Constraint on Number of Starts and Stops)

Further, an upper limit value on the number of starts and stops may be added to the constraint conditions by adding the condition that the number of starts and stops of the air-conditioning apparatus 2 is to be maintained at less than or equal to a preset number of starts and stops upper limit value. For example, in the air-conditioning system control apparatus 3, a constraint is added to the number of starts and stops by adding the condition that the upper limit value of the number of starts and stops is to be less than or equal to once per hour.
(Effects Relating to Constraint on Number of Starts and Stops)

As a result, the air-conditioning system control apparatus 3 can realize a power saving operation not to harm the device life of the compressor and other devices included in the air-conditioning apparatus 2.
(Effects Relating to Objective Function and Constraint Conditions)

According to the above description, the air-conditioning system control apparatus 3 is capable of determining the optimum control command based on various perspectives such as the comfort level, the suppression of peak power, and the device life of the air-conditioning apparatus 2.

Thus, in Embodiment 3, the constraint conditions include any one of, or a combination of two or more of, a first condition for maintaining a rate of change over time in indoor temperature and humidity in a preset range for the rate of change over time in temperature and humidity, a second condition for maintaining the power consumption of the air-conditioning apparatus 2 in a preset power consumption range, and a third condition for maintaining a number of starts and stops of the air-conditioning apparatus 2 within a predetermined number.

With the configuration described above, not only can fluctuations in the indoor temperature and humidity be kept within a permissible fluctuation range for the indoor temperature and humidity, but power consumption can be reduced while frequent changes in the indoor temperature, the peak power, and the number of starts and stops of the air-conditioning apparatus 2 are kept within a permissible range.

Further, in Embodiment 3, the objective function include any one of, or a combination of two or more of, the power consumption of the air-conditioning apparatus 2, the running cost of the air-conditioning apparatus, a deviation in indoor temperature from a set temperature, a deviation in indoor humidity from a set humidity, a rate of change over time in indoor temperature, and a rate of change over time in indoor humidity.

With the configuration described above, not only can the power consumption and the running cost be minimized, but, by using the objective function including the comfort level, the air-conditioning apparatus 2 can be operated in consideration of a balance between reduced power consumption and the comfort level.

REFERENCE SIGNS LIST 1 meteorological data distribution company 2 air-conditioning apparatus 3 air-conditioning system control apparatus 4 meteorological data acquisition unit 5 air-conditioning apparatus operating data acquisition unit 6 control data output unit 7 air-conditioning apparatus characteristic data 7b wall material surface humidity characteristic data 8 data storage unit 9 input data for parameter setting 10 thermal characteristic parameter setting unit 10a building thermal model 11 thermal characteristic parameter 12 humidity characteristic parameter setting unit 12a building humidity model 13 humidity characteristic parameter 14 input data for prediction 15 control data generation unit 15a thermal load prediction unit 15b indoor temperature and humidity prediction unit 16 control data 41 outside air temperature 42 amount of solar radiation 43 adjacent room temperature 44 indoor temperature 45 amount of heat removed by air conditioning 46 amount of heat generated indoors outside air absolute humidity 52 amount of moisture produced indoors 53 dehumidification amount during cooling by the air-conditioning apparatus 54 indoor absolute humidity 55 wall surface absolute humidity 100 communication unit

The invention claimed is:

1. An air-conditioning system control apparatus configured to control an air-conditioning apparatus configured to air-condition an air-conditioned space of a building, the air-conditioning system control apparatus comprising:
   a data storage device configured to store input data for parameter setting including at least meteorological data of a region including the building and operating data of the air-conditioning apparatus; and
   a controller including information on a building thermal model that is based on a heat equation of the air-conditioned space, and information on a building humidity model that is based on a moisture balance equation of the air-conditioned space, the controller being configured to:
      determine, based on the input data for parameter setting, a thermal characteristic parameter, which is a physical parameter of the building thermal model;
      determine, based on the thermal characteristic parameter and the input data for parameter setting, a humidity characteristic parameter, which is a physical parameter of the building humidity model;
      generate, based on input data for prediction including at least the input data for parameter setting, the building thermal model, the building humidity model, the thermal characteristic parameter, and the humidity characteristic parameter, control data of the air-conditioning apparatus so that a temperature and a humidity of the air-conditioned space are each within a preset range;
      transmit the control data to the air-conditioning apparatus; and
      operate the air-conditioning apparatus based on the control data,
   wherein the building humidity model is based on the moisture balance equation including, as influencing factors, a change in moisture by ventilation of the air-conditioned space, an amount of moisture produced in the air-conditioned space, a dehumidification amount produced during cooling by the air-conditioning apparatus, an absorption and desorption level of moisture of a structure forming the air-conditioned space, and a change in moisture due to drafts in the air-conditioned space.

2. The air-conditioning system control apparatus of claim 1,
   wherein the controller is configured to:
      predict a thermal load of the air-conditioned space based on the building thermal model, the building humidity model, the thermal characteristic parameter, the humidity characteristic parameter, and the input data for prediction;
      predict the temperature and humidity of the air-conditioned space based on the building thermal model, the building humidity model, the thermal characteristic parameter, the humidity characteristic parameter, and the input data for prediction; and
      generate the control data of the air-conditioning apparatus based on the input data for prediction, the predicted thermal load of the air-conditioned space, and the predicted temperature and humidity of the air-conditioned s so that the temperature and humidity of the air-conditioned space are each within the preset range.

3. The air-conditioning system control apparatus of claim 2,
   wherein a plurality of the air-conditioning apparatus is installed in the building,
   wherein the input data for parameter setting includes air-conditioning apparatus characteristic data representing a relationship between a power consumption and a heat supply amount of each of the plurality of the air-conditioning apparatus, and
   wherein the controller is configured to generate the control data of each of the plurality of the air-conditioning apparatus so that a sum of the heat supply amounts of the plurality of the air-conditioning apparatus is the thermal load, the temperature and humidity of the air-conditioned space are each within the preset range, and a sum of values of the power consumption of the plurality of the air-conditioning apparatus is at a minimum.

4. The air-conditioning system control apparatus of claim 3, wherein the controller generates the control data of each of the plurality of the air-conditioning apparatus so that any one of, or a combination of two or more of, the sum of values of the power consumption of the plurality of the air-conditioning apparatus, a sum of running costs of the plurality of the air-conditioning apparatus, a deviation in the temperature of the air-conditioned space from a set temperature, a deviation in the humidity of the air-conditioned space from a set humidity, a rate of change over time in the temperature of the air-conditioned space, and a rate of change over time in the humidity of the air-conditioned space satisfies a preset condition.

5. The air-conditioning system control apparatus of claim 1, wherein the controller is configured to:
   determine a representative surface moisture transfer coefficient ($\alpha_X$), which is one of the humidity characteristic parameters, and which is a moisture transfer coefficient of a surface of the structure, based on a law of similarity between heat transfer and moisture transfer, and an indoor side thermal resistance ($R_Z$) and an indoor heat capacity ($C_Z$), which are included in the thermal characteristic parameters; and
   determine the absorption and desorption level of moisture of the structure based on the representative surface moisture transfer coefficient ($\alpha_X$).

6. The air-conditioning system control apparatus of claim 5, wherein the controller is configured to:
   determine a saturated water vapor amount ($X_{sat}$) using a surface temperature ($T_2$) of an indoor side of an exterior wall, which is one of the thermal characteristic parameters;

determine a surface absolute humidity ($X_S$), which is an absolute humidity of the surface of the structure, based on the saturated water vapor amount ($X_{sat}$); and determine the absorption and desorption level of moisture of the structure based on the representative surface moisture transfer coefficient ($\alpha_x$) and the surface absolute humidity ($X_S$).

7. The air-conditioning system control apparatus of claim 1, wherein the controller employs a correction coefficient ($\rho$) of heat generated by people included in the thermal characteristic parameters as a correction coefficient ($\sigma$) for correcting the amount of moisture produced in the air-conditioned space.

8. The air-conditioning system control apparatus of claim 1, wherein the controller employs a correction coefficient ($\delta$) of a heat supply amount of the air-conditioning apparatus included in the thermal characteristic parameters as a correction coefficient ($\omega$) for correcting the dehumidification amount produced during the cooling by the air-conditioning apparatus.

9. The air-conditioning system control apparatus of claim 8, wherein the building humidity model expresses moisture transfer between a material surface of the structure and the air-conditioned space using a rate of change in moisture content with respect to an absolute humidity gradient ($C_{\theta x}$), which is a rate of change in moisture content of a material interior of the structure with respect to an absolute humidity, and a rate of change in moisture content with respect to a surface temperature gradient ($C_{\theta T}$), which is a rate of change in the moisture content of the material interior of the structure with respect to a surface temperature.

10. The air-conditioning system control apparatus of claim 1, wherein the absorption and desorption level of moisture is based on a moisture balance equation of a material interior of the structure.

11. The air-conditioning system control apparatus of claim 1, wherein the controller generates the control data of the air-conditioning apparatus by selecting any one of, or a combination of two or more of, a first condition for maintaining a rate of change over time in the temperature and humidity of the air-conditioned space in a preset range for the rate of change over time in the temperature and humidity, a second condition for maintaining a power consumption of the air-conditioning apparatus in a preset power consumption range, and a third condition for maintaining a number of starts and stops of the air-conditioning apparatus within a predetermined number.

12. An air-conditioning system control apparatus configured to control an air-conditioning apparatus configured to air-condition an air-conditioned space of a building, the air-conditioning system control apparatus comprising:

a data storage device configured to store input data for parameter setting including at least meteorological data of a region including the building and operating data of the air-conditioning apparatus; and a controller including information on a building thermal model that is based on a heat equation of the air-conditioned space, and information on a building humidity model that is based on a moisture balance equation that includes at least an absorption and desorption level of moisture of a structure forming the air-conditioned space as an influencing factor, the controller being configured to:

determine, based on the input data for parameter setting, a thermal characteristic parameter, which is a physical parameter of the building thermal model;

determine a representative surface moisture transfer coefficient ($\alpha_x$), which is one of the humidity characteristic parameters, and which is a moisture transfer coefficient of a surface of the structure, based on a law of similarity between heat transfer and moisture transfer, and an indoor side thermal resistance ($R_Z$) and an indoor heat capacity ($C_Z$), which are included in the thermal characteristic parameters;

determine the absorption and desorption level of moisture of the structure based on the representative surface moisture transfer coefficient ($\alpha_x$);

determine, based on the thermal characteristic parameter and the input data for parameter setting, a humidity characteristic parameter, which is a physical parameter of the building humidity model;

generate, based on input data for prediction including at least the input data for parameter setting, the building thermal model, the building humidity model, the thermal characteristic parameter, and the humidity characteristic parameter, control data of the air-conditioning apparatus so that a temperature B and a humidity of the air-conditioned space are each within a preset range;

transmit the control data to the air-conditioning apparatus; and operate the air-conditioning apparatus based on the control data.

* * * * *